Aug. 2, 1966  R. H. CARLSON  3,263,533
SCREW EXTRACTOR
Filed Aug. 27, 1964

INVENTOR
BY
BUCKHORN, BLORE, KLARQUIST & SPARKMAN
ATTORNEYS

United States Patent Office 3,263,533
Patented August 2, 1966

3,263,533
SCREW EXTRACTOR
Raymond H. Carlson, Rockford, Ill., assignor to Textron Industries, Inc., Rockford, Ill., a corporation of Delaware
Filed Aug. 27, 1964, Ser. No. 392,578
3 Claims. (Cl. 81—71)

The present invention relates to screw extractors, and more particularly to screw extractors of the sort which are driven into broken screw segments in a manner such that the driving torque applied to the extractor tends to unthread the screw segment from the body in which it is embedded.

A recent well-known development in the art of self-tapping screws is the so-called Taptite thread, which is characteried by a pitch cylinder having, in cross section, the form of an arcuate equilateral triangle with arcuate sides and intermediate arcuate lobes. The characteristic low driving torque required by Taptite threaded screws enables the swaging of threads in metals of such hardnesses and thicknesses which heretofore could be threaded only with thread-cutting taps. In accordance with the present invention a Taptite thread form is provided on a screw extractor for forming threads in a pilot hole drilled in the end of a broken screw, with resulting advantages in effectiveness of withdrawal, efficiency of operation and cost.

Prior extractors, having a pitch cylinder of circular cross-sectional shape, tend to cause a lateral swelling of the screw segment to be removed when driven into such segment. The swelling causes an increasingly tight fit between the mating threads of the screw and parent body in which the screw is threaded, making unthreading of the screw exceptionally difficult. Moreover, such prior extractors, because of their characteristic multiple helical ribs having large lead angles, tend to ream out the hole in the screw segment into which they are driven, thus requiring careful driving to avoid the necessity of repeating the extraction procedure with an extractor of larger diameter.

Accordingly, a primary object of the present invention is to provide a new and improved screw extractor which overcomes the above objections.

Specifically, an object of the invention is to provide a screw extractor that does not tend to ream out the hole nor swell the screw segment into which it is driven.

A further object is to provide a screw extractor which can be threaded into a screw segment wtih a minimum driving torque.

A further object is to provide a screw extractor having means for effecting counter rotation of the screw to be extracted after the extractor has been driven a predetermined distance into the screw.

Another object is to provide a screw extractor having means for lubricating the mutually engaged surfaces of the extractor and the screw as the extractor is driven into the screw.

In furtherance of the above objects, a screw extractor in accordance with an illustrated embodiment has a cylindrical unthreaded shank portion with a driving means at one end and a relatively short threaded lobular shank portion projecting from the opposite end thereof. The lobular shank portion is provided with a single rolled left-hand thread extending continuously from its tapered work-entering end to its intersection with the cylindrical shank portion. As viewed in cross section, the lobular threaded shank portion is in the shape of a generally arcuate equilateral triangle having arcuate sides and arcuate lobes at the intersections of the sides. A shoulder is provided at the intersection of the threaded and unthreaded shank portions, which shoulder, upon driving the extractor into a screw to be extracted, eventually abuts the outer end of such screw whereupon continual application of driving torque unthreads the screw from its parent body.

The above and other features, objects and advantages of the invention will become more apparent from the following description and the accompanying drawings wherein.

Figure 1:
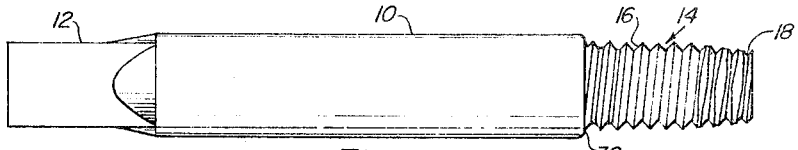
FIG. 1 is an elevational view of a screw extractor in accordance with the invention.

In this specification and accompanying claims the following definitions shall apply:

"Pitch cylinder" is, on a straight thread, an imaginary coaxial cylinder, the surface of which would pass through the thread profiles, or the projections thereof, at such points as to make the widths of the groove, or the projection thereof, equal to one-half the basic pitch.

"Pitch cone" on a taper thread, is an imaginary coaxial cone, the surface of which would pass through the thread profiles, or the projection thereof, at such points as to make the width of the groove, or the projection thereof, equal to one-half the basic pitch.

"Pitch surface" is the imaginary surface of either the pitch cylinder or the pitch cone.

"Pitch surface cross section" is the transverse cross section of any pitch surface, such as that of either the pitch cylinder or the pitch cone, as hereinbefore defined. Such cross section may be of arcuate polygonal configuration.

"Width" of the pitch surface is used as a generic term to designate the maximum transverse dimension of any pitch surface cross section such as that of either a pitch cylinder or a pitch cone. In the case of a pitch cylinder or a pitch cone, the "width" is synonymous with the "pitch diameter" of such cross section as determined by the three-wire method of pitch diameter measurement, as disclosed, for example, in the U.S. National Bureau of Standards Handbook No. H28 (1957).

"Crest surface" is the surface of either the crest (major) cylinder or the crest (major) cone. The crest cylinder is, on a straight thread, the imaginary coaxial cylinder that would bound the crest of an external thread. The crest cone is, on a taper thread, an imaginary cone having an apex angle equal to that of the pitch cone, the surface of which would bound the crest of an external thread.

"Root surface" is the surface of either the root or minor cylinder or the root or minor cone. The root or minor cylinder is, on a straight thread, the imaginary coaxial cylinder that would bound the root of an external thread. The root or minor cone is, on a taper thread, a cone having an apex angle equal to that of the pitch cone, the surface of which would bound the root of an external thread.

"Lead angle," on a straight thread, is the angle made by the helix of the thread at the pitch line with a plane perpendicular to the axis. On a taper thread, the lead angle at a given axial position is the angle made by the conical spiral of the thread at the pitch line with a plane perpendicular to the axis at that position.

With reference to FIGS. 1 through 4 of the drawings, the illustrated screw extractor includes an elongate unthreaded shank portion 10 of cylindrical shape having a driving means 12 of rectangular cross section at one end for insertion into a driving tool. Extending from the opposite end of the shank portion 10 is a relatively short, threaded lobular shank portion 14 having a single rolled thread 16 extending continuously from a tapered work-entering end 18 to the intersection of the lobular shank portion with the cylindrical shank portion 10.

The thread 16 is a left-hand thread having a relatively small lead angle L of the order commonly provided on ASA type "A," "B" or "C" self-tapping screws, which angle is substantially less than 30° and usually between 1° and 20° in order that the thread will be self tapping in a pilot hole of a screw to be extracted. This should be compared with the relatively large lead angle of between 45° and 65° usually provided on prior art multiple-thread extractors, the threads of which approach the form of thread provided on ASA type U metallic drive screws.

When driven into the screw to be extracted, the left-hand thread of the present device exerts a torque in a direction for unthreading the usual screw segment having a right-hand thread. However, an extractor having a right-hand thread would be used for extracting fasteners having left-hand threads. In any event, the extractor will have a thread which, when viewed axially, winds in a receding direction opposite to the receding direction in which the screw thread of the member to be extracted winds.

Figure 2:
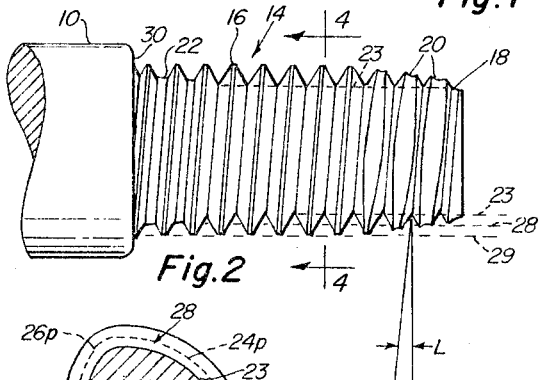
FIG. 2 is an enlarged elevational view of the threaded portion of the extractor of FIG. 1.

From FIG. 2 it will be apparent that the threads on the tapered work-entering end 18 are unfinished and become progressively less finished in a direction toward the tip of the work-entering end. In other words, the crest 20 of the two or three thread convolutions in the work-entering end portion taper inwardly in a direction toward the tip of the end portion, whereas the root and pitch surfaces of such thread convolutions retain a substantially constant width throughout such end portion and, in fact, throughout the major extent of the threaded shank portion.

It will also be noted from FIG. 2 that the thread convolutions nearest the cylindrical shank portion 10 have an enlarged root surface portion 22 having a greater transverse width than that of the root surface 23 throughout the remainder of the threaded shank. The enlarged root portion decreases the concentration of stresses at the intersection of the cylindrical and lobular shank portions thereby reducing the possibility of metal failure at such points upon the application of driving torque. Such root portion also increases the torque required to drive the extractor into the screw to be extracted as the threaded shank portion having such enlarged root begins to enter the segment, so that with all but the most tightly threaded screw segments the continued application of driving torque to the extractor at this point will unthread the segment from its parent body.

Figure 3:
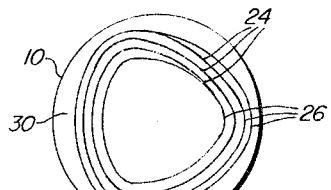
FIG. 3 is an enlarged end view of the extractor of FIG. 1.
Figure 4:
FIG. 4 is a schematic sectional view through the threaded shank portion of the extractor taken approximately along the line 4—4 of FIG. 2.

As viewed in cross section, or axially, as in FIG. 3, the lobular shank portion approaches the form of an arcuate equilateral triangle having arcuate sides 24 and arcuate lobes 26 at the intersections of such sides. Stated with reference to any cross section through the imaginary pitch surface 28 of the thread indicated in dashed lines in FIGS. 2 and 4, which surface is of like arcuate equilateral triangular shape, the arcuate sides 24p have a radius of curvature substantially greater than one-half the width of the cross section, and the arcuate lobes 26p are defined by a radius of curvature substantially less than one-half the width of the cross section. Such cross sections are also characterized in having a constant width throughout 360°. This feature enables the described thread formation to be provided on the extractor by rolling a blank approximating the same cross sectional shape between flat thread-rolling dies or other conventional forms of such dies, the thread-forming ridges of which are uniformly spaced apart.

Although in the preferred embodiment the specified lobular cross section extends throughout the entire threaded length of the shank, it is important that the pitch surface cross sections of at least those thread convolutions on the work-entering end portion have such lobular, arcuate polygonal shape because these convolutions do the majority of the work in swaging a female thread in the fastener to be extracted. It is such convolutions, therefore, that generate the greatest proportion of the required driving torque and that exert the greatest lateral pressure tending to swell the screw segment. The arcuate sides and lobes of the specified arcuate polygonal thread cross section in such end portion present a series of circumferentially spaced relieved areas on the work-entering end which reduce the required driving torque to a minimum in the usually hard metal of the screw segment and minimize lateral expansion of the segment by permitting periodic relaxation of the metal of such segment as the extractor is driven therein.

It will be noted from FIGS. 2 and 3 that the maximum transverse dimension of the lobular shank portion, that is, the maximum width of the crest surface 29 of such portion, is less than the diameter, or maximum width, of the cylindrical shank portion. Moreover, the intersection of the lobular and cylindrical shank portions defines a rounded shoulder 30. During the extracting operation, the shoulder serves as a stop which abuts against the outer end of the screw segment to be removed so that continued application of driving torque unthreads the screw segment from its parent member.

The extractor of FIG. 1 is preferably made by providing a cylindrical length of rod stock, then cold-heading one end to form the rectangular driving means 12 and extruding the opposite end through a die orifice of arcuate triangular shape approximating the cross-sectional shape of the pitch surface of the thread desired so as to form a blank portion of like triangular shape. That is, the extruded blank portion in cross section will have arcuate sides defined by a radius of curvature greater than one-half the width of such cross section and approximately a constant width throughout 360°. The lobular blank portion is then rolled between a pair of flat or other conventional thread-rolling dies (not shown), the thread-forming ridges of which are uniformly spaced apart, to form a thread on such portion of the previously specified lobular arcuate triangular configuration. The free end of the lobular blank portion may be tapered inwardly slightly so that tapered thread crests 20 will be rolled on the work-entering end of the extractor during the thread-rolling operation. The enlarged root surfaces 22 at the opposite end of the threaded shank portion may be provided by tapering the crests on the corresponding ridges of the thread-rolling dies.

Figure 5:
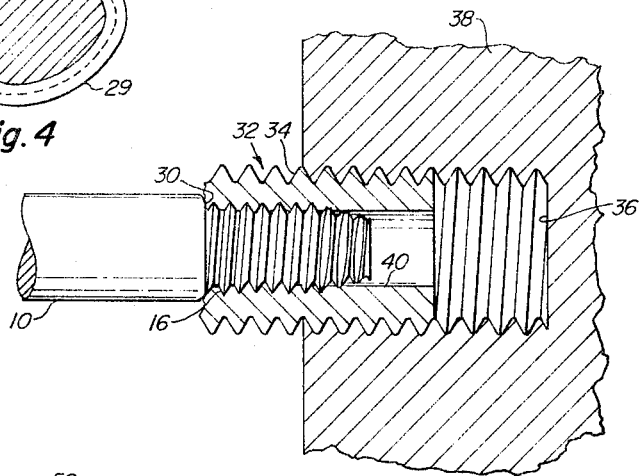
FIG. 5 is a sectional view illustrating the removal of a broken screw segment from its parent body.

An extraction operation is illustrated in FIG. 5 wherein a threaded screw segment 32 having a right-hand thread 34 has been broken off from the remainder of the screw after being partially driven into the tapped hole 36 of a parent body 38. First, a pilot hole 40 is driven either fully (as illustrated) or partially through the screw segment 32. The diameter of the pilot hole approximates the maximum pitch diameter, that is, the width, of the pitch surface of the thread on the extractor to be employed in the operation. The extractor, as described with respect to FIG. 1 and having a left-hand thread 16, is driven into the pilot hole 40, preferably using a power driver (not shown). The extractor will thread its way progressively deeper into the pilot hole until such time as the required driving torque exceeds the frictional forces resisting the unthreading of the segment, at which point continued application of torque to the extractor will unthread the screw segment from the tapped hole 36. In the illustrated extraction operation this occurs when the shoulder 30 of the extractor engages the outer end of the screw segment 32.

If, on the other hand, the length of the threaded shank portion 14 is greater than either the depth of the pilot hole 40 when the latter does not extend through the screw segment, or the tapped hole 36 if the pilot 40 does extend through such segment, then the screw will begin to unthread when the tip of the threaded shank portion 14 bottoms against the inner end of one or the other of such holes. However, as previously indicated, the enlarged root portion 22 of the thread convolutions nearest the shoulder 30 in many instances will cause an increase in driving torque sufficient to counter rotate the screw segment from its hole before any of the above limiting conditions occur.

Figure 6:
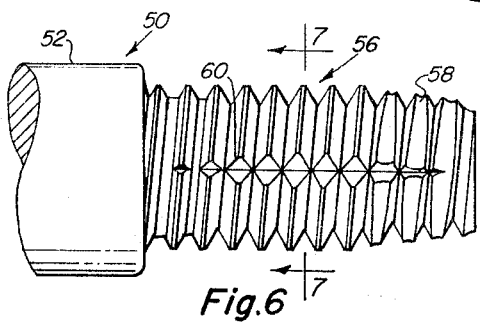
FIG. 6 is an enlarged side elevational view of the threaded portion of a modification in accordance with the invention.
Figure 7:
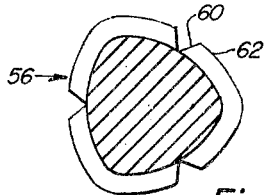
FIG. 7 is a schematic sectional view taken along the line 7—7 of FIG. 6.

FIGS. 6 and 7 illustrate a modified form of extractor 50 in accordance with the present invention. Such extractor has a cylindrical unthreaded shank portion 52, driving means (not shown) and a threaded lobular shank portion 56 including a tapered work-entering end 58 all as described with respect to FIG. 1 with the exception that a series of circumferentially spaced axially extending flutes 60 are provided on the lobular shank portion 56 for lubricating the extractor threads and the walls of the pilot hole into which the extractor is driven. As indicated in FIG. 7, there is one generally V-shaped flute 60 provided at the midportion of each arcuate side 62 of the arcuate triangular shank portion 56. The depth of each flute preferably does not exceed the height of each thread convolution through which the flute extends so that the torsional strength of the shank cross section will not be reduced appreciably by the cutting of such flutes across the threads.

Either of the illustrated forms of extractors provide the important advantages of not swelling a screw segment when driven therein and of applying a positive back-out torque to unthread the screw segment after a predetermined penetration of the segment by the threaded portion of the extractor.

Having illustrated and described some preferred embodiments of the invention, it will be appreciated by those skilled in the art that the invention permits of modification in arrangement and detail. I claim as my invention all such modifications as come within the true spirit and scope of the following claims.

I claim:

1. A device for extracting broken screw-threaded members from materials into which said members have been at least partially threaded, said device comprising:
    an elongate member including a cylindrical unthreaded shank portion having a driving means at one end and a threaded lobular shank portion extending from the opposite end thereof,
    said lobular threaded shank portion having a single rolled screw thread with a plurality of convolutions extending continuously from the work-entering end portion thereof to a position adjacent said opposite end of said cylindrical shank portion,
    said thread, as viewed axially, winding in a receding direction opposite to the receding direction in which the thread on the member to be extracted winds,
    said thread, at least in said work-entering end portion, having a pitch surface which in cross section is in the shape of an arcuate lobular equilateral triangle having convexly arcuate sides and arcuate lobes at the intersections of said sides,
    the crest of said thread in said work-entering end portion tapering inwardly in a direction toward the tip of said end portion,
    the lead angle of said thread being less than 30°,
    the crest surface defined by said thread next adjacent the intersection of said cylindrical and lobular shank portions having, in transverse cross section through said lobular shank portion, a maximum width less than the width of said cylindrical shank portion such that the intersection of said lobular and cylindrical shank portions defines a shoulder for abutting the exposed end of a member to be extracted so as to facilitate unthreading of said member to be extracted from its parent body.

2. A device for extracting broken screw-threaded members from materials into which said members have been at least partially threaded, said device comprising:
    an elongate member including an unthreaded cylindrical shank portion having a driving means at one end and a lobular threaded shank portion extending from the opposite end thereof,
    said lobular shank portion having a single left-hand, rolled screw thread extending in a plurality of helical convolutions continuously from the work-entering end portion thereof to a position immediately adjacent the opposite end of said cylindrical shank portion,
    the lead angle of said thread being less than 30°,
    said thread, at least in said work-entering end portion, having a pitch surface which in any transverse cross section through said portion is in the shape of an arcuate lobular equilateral triangle having convexly arcuate sides merging with intermediate arcuate lobes,
    the radius of curvature of said sides being greater than one-half the width of such cross section,
    the radius of curvature of said lobes being less than one-half the width of such cross section,
    the crest of said thread at said work-entering end portion tapering inwardly in a direction toward the tip of said end portion,
    the crest surface defined by said thread having a maximum width adjacent the opposite end of said cylindrical shank portion less than the diameter of said cylindrical shank portion such that the intersection of said lobular and cylindrical shank portions defines a shoulder for abutting the exposed end of a member to be extracted so as to facilitate counter rotation and removal of said member from its parent body,
    said threaded lobular shank portion being provided with a plurality of axially extending, equally circumferentially spaced-apart lubricant-carrying flutes, one at the midportion of each of said arcuate sides, the depth of said flutes not exceeding the full depth of said thread.

3. A device for extracting broken screw-threaded members from materials into which said members have been at least partially threaded, said device comprising:
    an elongate member including a cylindrical unthreaded shank portion having a driving means at one end and a threaded lobular shank portion extending from the opposite end thereof,
    said lobular threaded shank portion having a single rolled screw thread with a plurality of convolutions extending continuously from the work-entering end portion thereof to a position adjacent said opposite end of said cylindrical shank portion,
    said thread, as viewed axially, winding in a receding direction opposite to the receding direction in which the thread on the member to be extracted winds,
    said thread, at least in said work-entering end portion, having a pitch surface which in cross section is in the shape of an arcuate lobular equilateral triangle having convexly arcuate sides and arcuate lobes at the intersections of said sides,
    the crest of said thread in said work-entering end portion tapering inwardly in a direction toward the tip of said end portion,
    the lead angle of said thread being less than 30°,
    the crest surface defined by said thread next adjacent the intersection of said cylindrical and lobular shank portions having, in transverse cross section through said lobular shank portion, a maximum width less than the width of said cylindrical shank portion such that the intersection of said lobular and cylindrical shank portions defines a shoulder for abutting the exposed end of a member to be extracted so as to facilitate unthreading of said member to be extracted from its parent body, the root surface portions of the thread convolutions nearest said cylindrical unthreaded shank portion being in transverse cross section through said threaded shank portion of greater width than the root surface portions throughout the remaining length of said threaded shank portion.

References Cited by the Examiner

UNITED STATES PATENTS

| | | | |
|---|---|---|---|
| 1,863,046 | 6/1931 | Githens et al. | 81—71 X |
| 2,269,476 | 1/1941 | Poupitch | 151—14 |
| 2,684,606 | 7/1954 | Brawley | 81—53 |
| 2,694,328 | 11/1954 | La Freniere | 81—53 X |
| 3,195,156 | 7/1965 | Phipard | 10—10 |
| 3,209,383 | 10/1965 | Carlson | 10—152 |

WILLIAM FELDMAN, *Primary Examiner.*

G. WEIDENFELD, *Assistant Examiner.*